United States Patent [19]

Putman et al.

[11] 4,356,441

[45] Oct. 26, 1982

[54] VOLTAGE REGULATOR UTILIZING A STATIC VAR GENERATOR WITH HALF PERIOD AVERAGING AND SATURATING TYPE FIRING ANGLE CONTROL

[75] Inventors: Thomas H. Putman; Laszlo Gyugyi, both of Penn Hills; Michael B. Brennen, Wilkins Township, Allegheny County, all of Pa.

[73] Assignee: Electric Power Research Institute, Inc., Palo Alto, Calif.

[21] Appl. No.: 811,796

[22] Filed: Jun. 30, 1977

[51] Int. Cl.³ .............................................. H02J 3/18
[52] U.S. Cl. ................................................... 323/210
[58] Field of Search ............... 323/101, 106, 119, 124, 323/205, 208, 209, 210, 211

[56] References Cited
U.S. PATENT DOCUMENTS

3,942,100  3/1976  Käuferle et al. ................ 323/119 X
3,987,360  10/1976  Brennen et al. ..................... 323/101
4,104,576  8/1978  Frank ................................... 323/210

Primary Examiner—A. D. Pellinen
Attorney, Agent, or Firm—M. J. Moran

[57] ABSTRACT

A voltage regulator is taught for maintaining the terminal voltage of a three phase transmission line at a fixed reference value. The voltage regulator system utilizes the reactance of the transmission line in conjunction with reactive current from a VAR generator to compensate for the voltage effect of line current as it flows through the line reactance. The VAR generator is of the parallel capacitor-inductor type where the inductor is controlled by a thyristor switch. The conduction of the thyristor is controlled by utilizing a control system which generates an error signal based on the half period average of line voltage. The error signal is converted to a signal which is proportional to flux linkages by an integrator and then compared with the integral of the voltage signal for determining the conduction angle of the thyristor switches.

11 Claims, 24 Drawing Figures

VOLTAGE REGULATOR UTILIZING A STATIC VAR GENERATOR WITH HALF PERIOD AVERAGING AND SATURATING TYPE FIRING ANGLE CONTROL

CROSS-REFERENCE TO RELATED APPLICATIONS

The subject matter of this invention is related to other inventions disclosed and claimed in concurrently filed U.S. patent application Ser. No. 811,795, now U.S. Pat. No. 4,156,176, by the same inventors as the present application.

BACKGROUND OF THE INVENTION

1. Field of the Invention

The subject matter of this invention relates generally to voltage regulators for three phase voltage transmission, distribution or utilization lines. The subject matter of this invention relates more particularly to the utilization of static controlled VAR generators for providing voltage regulation.

2. Description of the Prior Art

It is well known to utilize voltage regulators to stabilize the voltage at a particular terminal location on multi-phase electrical transmission, distribution or utilization lines. It has been found that a transmission line may be represented by an apparent impedance which may be primarily inductive. A varying load connected to the terminals to be regulated causes the line current to vary. The varying line current produces a voltage drop across the impedance of the line which vectorially adds to the source voltage thus producing a terminal voltage which may be less than, equal to or greater than the source voltage, depending upon many things including the effects of other components in the system. This observed phenomena becomes significant as the line current varies because the varying line current changes the voltage drop across the apparent impedance of the line, thus changing the voltage at the terminals supplying power to the load. This characteristic is undesirable in a circuit which is to be regulated. A regulating apparatus may be provided at the terminals to compensate for the changes in the vectorially added source and inductive reactance voltage. It is generally well known that as load impedance decreases line current may become significantly larger, thus introducing a voltage drop in the supply line which subtracts from the terminal voltage of the load. It is undesirable to have load voltage vary in many instances. Consequently, a voltage regulator may be provided proximate to the terminals across which voltage is to be relatively constant. Typical AC regulators are described in the Control Engineers' Handbook edited by J. G. Truxal, 1958, Sections 11.18–11.21. Most popular schemes for voltage regulation utilize transformers, chokes or autotransformers in conjunction with voltage sensing device. These analog devices have a number of disadvantages which include lossiness and slow response time. It has recently been found that reactive current can be supplied to or withdrawn from electrical conductors by utilizing a fixed capacitor and thyristor controlled inductor connected in parallel across the lines. The fixed capacitor provides current which leads the voltage across the line by 90° and the thyristor controlled inductor provides current which lags the voltage across the line by 90°. the inductive current is therefore 180° out of phase with the capacitive current. By controlling the firing angle of the inductor thyristor switch which in turn controls the inductor, the amount of reactive current and its phase can be shifted, depending upon the parameters of inductance and capacitance, for example. Such being the case, leading or lagging reactive current may be supplied to the line. This has been utilized extensively in the past in the form of VAR (volt amps reactive) generator circuits. These circuits have been utilized for power factor correction and flicker control. Examples of such circuits may be found in U.S. Pat. Nos. 3,987,360, issued Oct. 19, 1976 to M. B. Brennen et al; 3,999,117, issued Dec. 21, 1976 to Gyugyi et al; and 4,000,455, issued Dec. 28, 1976 to Gyugyi et al. These patents teach VAR generation. The conduction angle of the thyristor which controls the current flowing through the inductor of the VAR generator is determined by a static control system which is interconnected with the lines to be controlled. It would be advantageous if a VAR generator type circuit with associated control could be utilized in conjunction with polyphase electrical transmission systems to provide voltage regulation. The subject matter of the present invention was at least partially disclosed in a report filed July 2, 1976 with the Electric Power Research Institute, Inc. by L. Gyugyi and W. J. Lordeon, entitled Quarterly Report No. 2, RP 750-1 "Transmission System Static VAR Control".

SUMMARY OF THE INVENTION

In accordance with the invention, a polyphase static VAR generator circuit of the parallel connected fixed capacitor and thyristor controlled inductor type is taught. The VAR generator circuit provides leading or lagging reactive current to the transmission line to compensate for reactive voltage generation in the transmission line due to the flow of line current. The amount of reactive current necessary to provide the compensating effect is determined by a sensing and control system which senses the voltage on each line of a phase to be regulated. The phase back or conduction angle as the case may be, is determined by splitting the voltage signal into positive and negative half cycles and integrating each in turn at appropriate times. The value of the integrated signal is tracked and stored for provision to a summing amplifier. The levels of signal provided to the summing amplifier are compared with a reference voltage signal. The output of the summing amplifier represents an error between the reference voltage and the actual voltage. This signal is then provided to a proportional and integral control unit which provides an output signal that is related not only to the error but to the integral of the error. This signal is then provided to an amplifier, the gain of which can be controlled to convert the voltage level of the latter signal to a value which is related to flux linkage. Flux linkage is then compared against the previously derived half wave integrated signals to determine when a firing pulse should be provided to appropriate thyristors. The track and store amplifier tracks appropriate integrated half wave signals and stores a level related to the average value of the integrated signal. This level is known as a half wave average level. These signals are provided serially to the previously mentioned summing amplifier to be compared with the reference level. The output of the thyristor firing angle generator is provided as a pulse to a thyristor for control thereof. This provides sufficient compensating voltage on the lines to be regulated to maintain a relatively high degree of regulation thereon. It is interesting to note that the provision of leading or lagging reactive current may be used to compensate for reactive voltage on the transmission line which is caused primarily by a resistive component of current flow. Only absolute values of voltage need be compensated for in the present invention. Phase shifts are considered relatively unimportant in this case because of expected minor changes therein.

BRIEF DESCRIPTION OF THE DRAWINGS

For a better understanding of the invention, reference may be had to the preferred embodiment thereof shown in the accompanying drawings in which.

DESCRIPTION OF THE PREFERRED EMBODIMENTS

Figure 1:
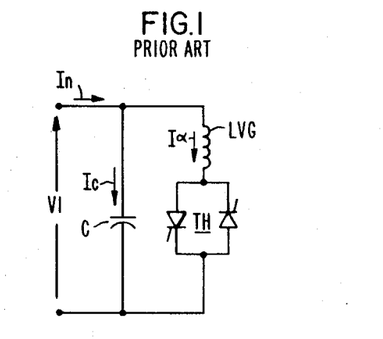
FIG. 1 shows a prior art single phase static VAR generator circuit.

Referring now to the drawings and FIG. 1 in particular, a prior art VAR generator for reactive current supply is shown. A voltage V1 is supplied across a fixed capacitor C and the series combination of an inductor LVG and a two-way thyristor switch TH connected in series circuit relationship. It is well known that the capacitive current Ic flowing through the capacitor C as the result of the voltage V1 leads the voltage V1 by 90 electrical degrees. On the other hand, the inductive current Iα which flows through the series combination of the inductor LVG and the thyristor switches TH lags the voltage V1 by 90 electrical degrees. Consequently, the inductive current Iα and the capacitive current Ic are 180° out-of-phase or generally complementary to each other if the amplitudes of the currents are the same.

Figure 2:
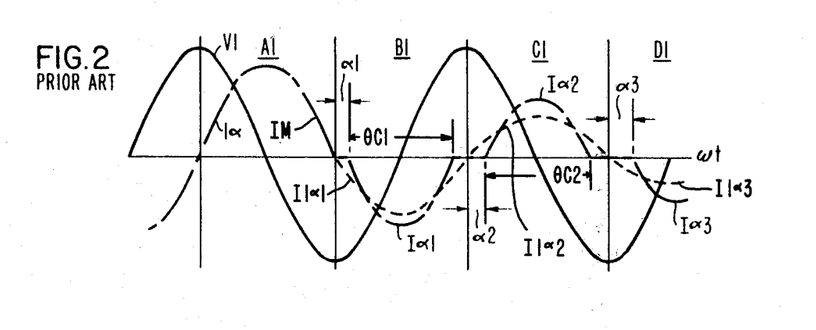
FIG. 2 shows phase back relationships for the generator of FIG. 1.

Referring now to FIG. 2 in conjunction with FIG. 1, the wave shapes of Iα as a function of ωt and the voltage V1 as a function of ωt are shown. In particular, it will be noted that as the firing angle α is changed from α1 to α2 to α3, for example, the current flow Iα1, Iα2 and Iα3 respectively in each of the regions B1, C1 and D1 respectively will change. These currents combine in each case with the fixed capacitive current Ic to produce a net current In as shown in FIG. 1. Depending upon the parameters of the VAR generator circuit, net leading or lagging reactive current In can be produced utilizing this apparatus.

Figure 3:
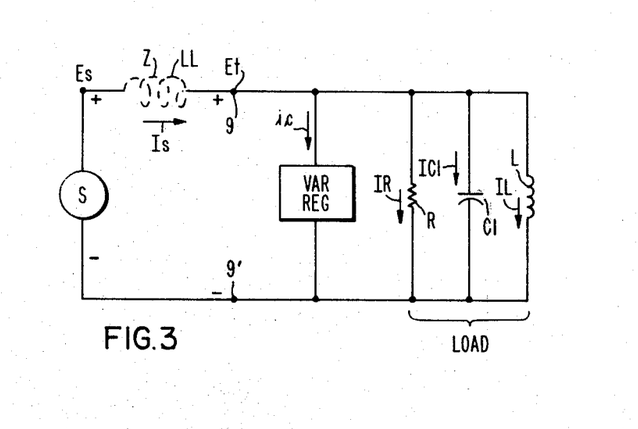
FIG. 3 shows a single phase transmission system utilizing a VAR regulator of the type disclosed in the present invention.

Referring now to FIG. 3, a reactive current generating system for regulating a transmission line is shown. In particular, the transmission line includes a source of voltage S which produces an A.C. generator voltage Es. There is provided in the transmission line a transmission line impedance Z which in this case is presumed to be inductive as represented by the symbol LL for purposes of simplicity of illustration. Through this transmission line and serially connected impedance Z flows source current Is. There is also provided a load LOAD which for purposes of simplicity is shown as parallel connected resistance R, capacitance C1 and inductance L. A VAR regulator VAR REG is provided to compensate for the effects of voltage change at the terminals 9 and 9'. The voltage at these terminals is represented by Et. The compensating current is represented by ic which is analogous to the current In of FIG. 1. The current through the resistive element R is represented by IR, the current through the capacitive element C1 is represented by IC1 and the current through the inductive element L is represented by the IL. It is well known that the current that flows through the resistive element R is a linear proportional function of the voltage Et. On the other hand the current which flows through the capacitive element C1 is related to the differential of the voltage Et taken with respect to ωt while the current which flows through the inductor L is related to the integral of the voltage Et taken with respect to ωt. Observation of power transmission, distribution or utilization circuits similar to the circuit shown in FIG. 3 has shown that changes in the load LOAD which cause current Is to change have an effect on the terminal voltage Et. In particular, it has been found that the voltage drop across the impedance Z is affected by the current Is flowing therethrough. In particular, a voltage drop is developed across Z as a function of the current Is. This voltage drop vectorially adds to the voltage Es of the source S, thus making the terminal voltage Et different than the source voltage Es. As is well known, a "vectorial addition" sometimes leads to an arithmetic subtraction. The purpose of the VAR regulator VAR REG is to supply compensating current for the impedance Z. Of course it is to be understood that the phrase "supply compensating current" includes the concept of sinking or removing reactive current in addition to adding or giving reactive current if the situation requires. The foregoing indicates that changes in terminal voltages can be compensated for by utilizing a VAR generator. In order for this to happen, however, a means for controlling the VAR generator must be provided and this means must be interconnected with the line to be regulated so that appropriate control of the VAR regulator can be accomplished.

Figure 4:
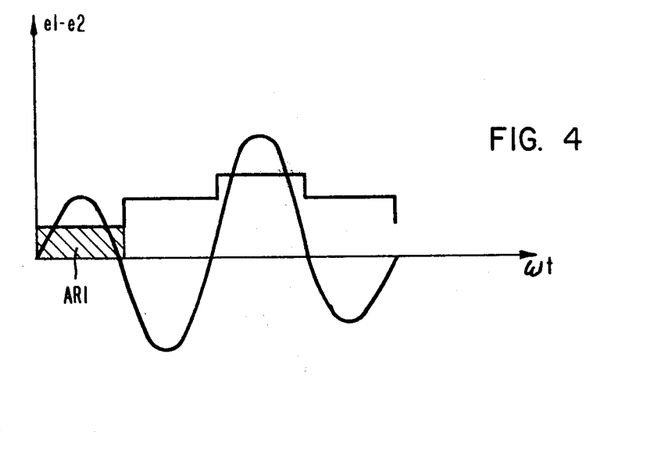
FIG. 4 shows an amplitude varying voltage signal with superimposed half cycle average levels.
Figure 9A:
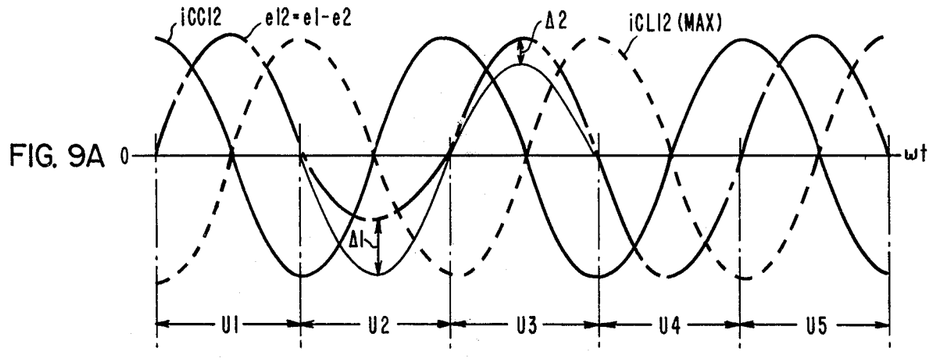
FIG. 9A shows a plot of one half cycle of voltage versus parallel connected inductor and capacitor current.
Figure 9P:
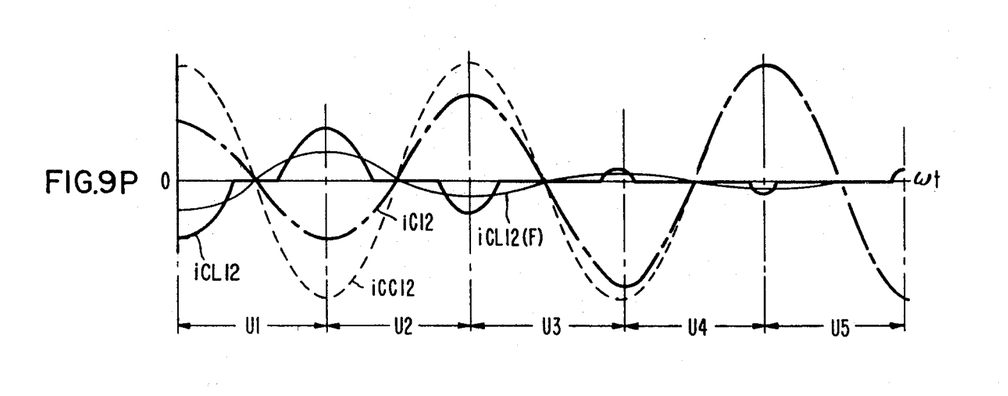
FIG. 9P shows the relationship of controlled inductor current, capacitor current and regulating current for the VAR regulator of FIG. 10.
Figure 10:
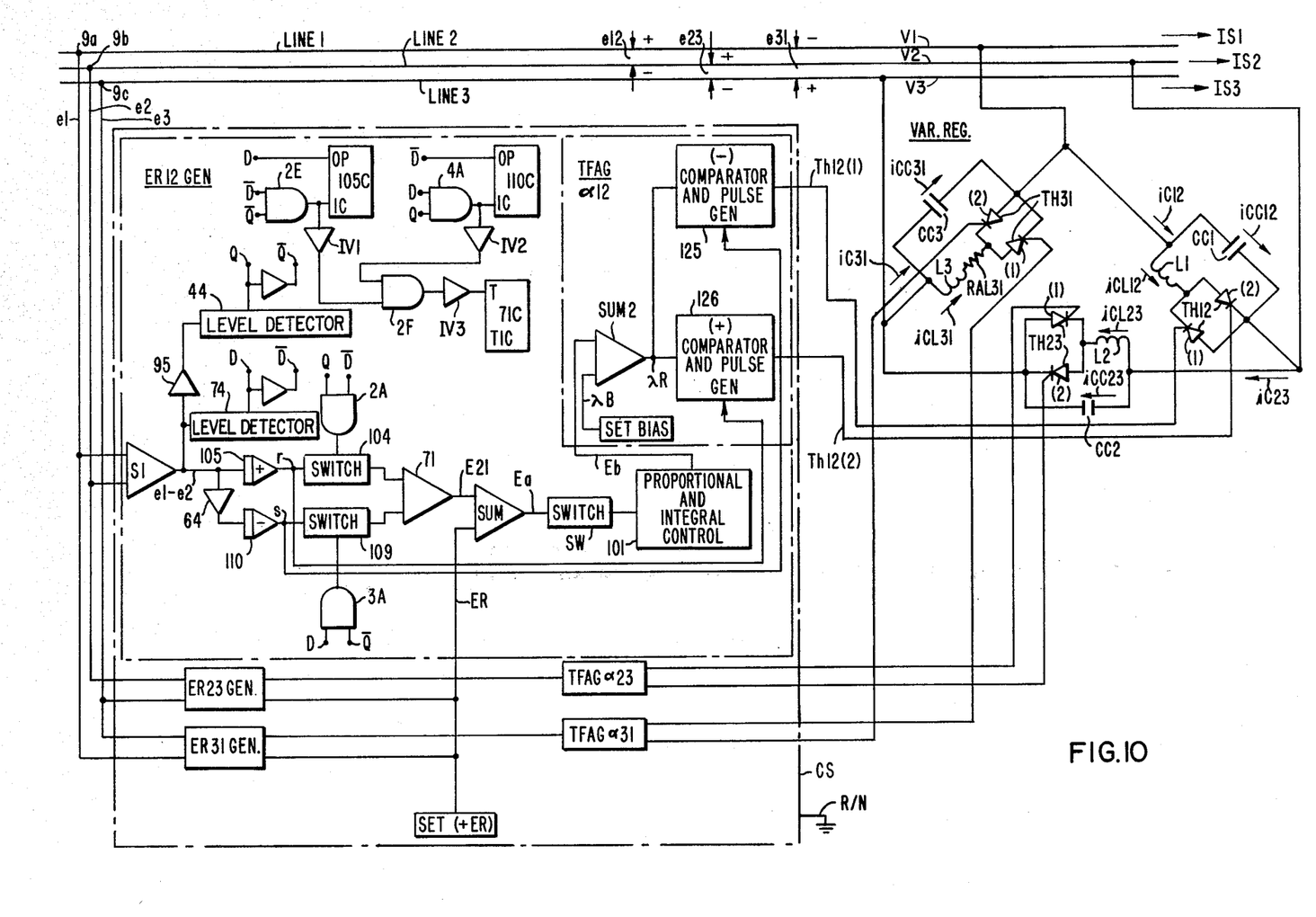
FIG. 10 shows a closed loop VAR regulating system embodying the teachings of the present invention.

Referring now to FIG. 4, a plot of voltage e1 minus e2 such as may be found between LINE 1 and LINE 2 of FIG. 10 is depicted. This voltage is analogous to voltage V1 of FIG. 1 and FIG. 2. Superimposed on the voltage plat (e1−e2) are half wave averages thereof strung together to form a continuous series of voltage levels, each of which is a half period or half wave long. These voltage levels are always positive even for the negative half cycles of the voltage e1 minus e2 of FIG. 4. The concept depicted in FIG. 4 is useful in controlling the output of a VAR generator such as the type shown in FIG. 10. Various methods have been found for implementing the control of a VAR generator. The one associated with FIG. 4 is often referred to as the half period average method. Underlying this method is the use of the line-to-line voltage, i.e. e1 minus e2, (e1−e2), as seen by a thyristor controlled reactor, i.e. LVG of FIG. 1 or L1 of FIG. 10 to generate a thyristor firing angle. To be more specific the area AR1 under the first level of FIG. 4 is proportional to the half period average of the area under the curve e2−e1 in the same time span. By appropriate scaling, the level can be made equal to the half period average of the appropriate waveform. Subtraction of this voltage from a reference voltage will produce an error signal. There are a number of ways to generate the half period average signal, one of which is shown in detail in FIG. 10 and described with respect to the waveforms of FIGS. 9A through 9P. It is of course to be understood that this is not the only way to generate half period average signals, it is merely provided for purpose of illustration. The implementation shown in FIG. 10 will be described in more detail hereinafter with respect to that figure.

Figure 5:
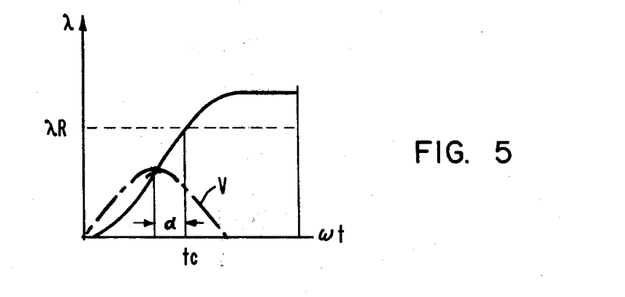
FIG. 5 shows the relationship between a voltage half wave and the integration thereof.

Referring now to FIG. 5, the relationship of flux linkage λ to voltage V for an embodiment of this invention is shown. To be more specific, positive half cycles of voltage V are gated to the input of an integrator which is placed in the operate disposition at the beginning of each voltage half cycle and reset between positive or negative half cycles as the case may be. It is to be understood that one set of integrators will be used for positive half cycles and another set of integrators will be used for negative half cycles. Since the time integral of voltage has the units of flux linkage λ, the output of the integrator shall be referred to as flux linkages. FIG. 5 shows such a relationship. The flux linkage signal λ may be compared with a reference level λR and a thyristor such as TH12 shown in FIG. 10 may be fired when λ is equal to or greater than λR. For the case shown in FIG. 5, the firing angle α will be obtained when λ is equal to λR. By changing the reference flux linkages, i.e. λR, the entire range of the firing angle α may be covered. The similarity between a saturable reactor operation and the operation described for the saturating firing angle control of FIG. 5 accounts for the name of this type of control. In the saturable reactor, the core is the integrator and the volt-seconds or flux linkages which can be absorbed before saturation depends upon the reset of the core. In the situation depicted in FIG. 5, the saturating level is determined by λR. It is not necessary to discuss in detail the physical implementation of equipment necessary to accomplish the purpose depicted in FIG. 5. However, an embodiment of the invention for generating such a signal is depicted with respect to the embodiment of FIG. 10 and will be discussed hereinafter with respect to that Figure. It is known, however, that a thyristor controlled reactor does not produce a sinusoidal current except when the firing angle thereof is zero; that is, when the conduction angle is 180°. The normal current for a thyristor controlled reactor consists of pulses of alternating polarity such as are shown in FIG. 2 at Iα, Iα1, Iα2, etc. It is the fundamental harmonic component of the pulse waveform, i.e. I1α1, I1α2, I1α3, etc., as is shown in FIG. 2, which is of importance because this component influences the fundamental component of the applied voltage which is to be regulated. In fact, in some cases, filters must be supplied to prevent other harmonic components of the reactor current from distorting the applied voltage. Thus, from a technical point of view, it would be desirable if the thyristor did not generate harmonic currents at all when operating to regulate the voltage. By well known techniques, it can be shown that the relationship between the thyristor conduction angle identified as θC (i.e. θC1, θC2, etc.) in FIG. 2 and the first harmonic components I1 is given by the following equation:

$$\frac{I1}{IM} = \frac{\theta C - \sin \theta C}{\pi} \quad (1)$$

where
I1 = amperes, fundamental current component;
IM = amperes, fundamental current when the SCR's conduct for one half cycle (see FIG. 2); and
θC = radians, electrical angle of thyristor conduction (see A1 of FIG. 2 for example).

Figure 6:
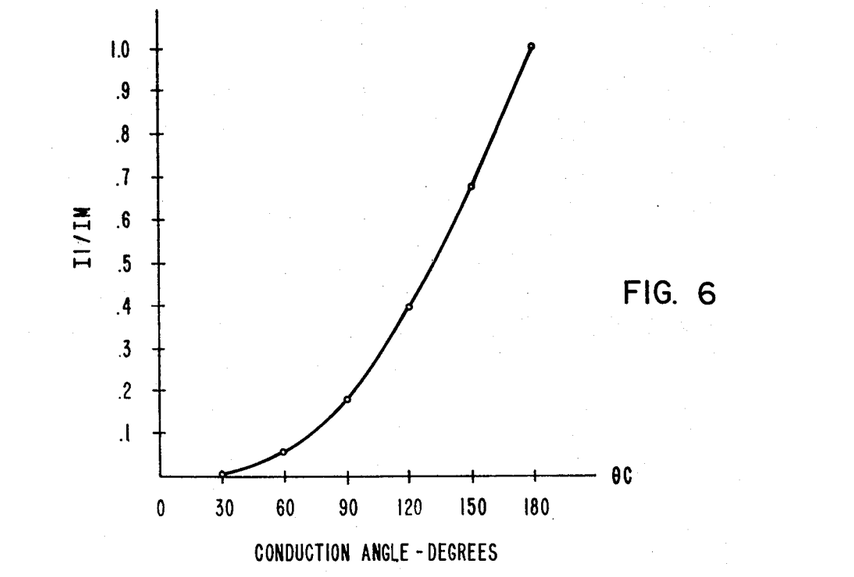
FIG. 6 shows a plot of conduction angle as it relates to the first harmonic of current in a thyristor.

Referring now to FIG. 6, a plot of the variables of equation (1) is shown. When the conduction angle θC is πradians (180°), one of the two thyristors shown in FIG. 2 or FIG. 10, is conducting at all times so that there are no harmonics generated and, $$I1 = IM = V/X \quad (2)$$

where
V = volts, amplitude of the applied voltage to the controlled reactor or inductor; and
X = ohms, reactance at the power frequency of the reactor.

Of particular importance is how slowly the first harmonic of current increases with the conduction angle θC. Thus with the conduction angle of π/2 radians (90°) there is only an 18% first harmonic current component. This means that the useful range of operation will be mostly at conduction angles in the range from 90 to 180 electrical degrees.

Referring once again to FIG. 5, the flux linkage during the first half cycle is:

$$\lambda = \int_0^t V \sin(\omega t)\, dt = \frac{V}{\omega}(1 - \cos(\omega t)) \quad (3)$$

where $\omega$ = radians/second, power line frequency. Conduction of the thyristor will commence when $\lambda = \lambda R$ at a time $t = tc$. Thus $$\lambda R = \frac{V}{\omega}(1 - \cos(\omega tc)) \quad (4)$$

or $$\cos(\omega tc) = 1 - \frac{\omega(\lambda R)}{V} \quad (5)$$

The conduction angle $\theta C$ is related to the time $tc$ by the expression $$\frac{\theta C}{2} = \pi - \omega tc \quad (6)$$

therefore $$\cos(\theta C/2) = \frac{\omega \lambda R}{V} - 1 = \frac{\lambda R}{IM \cdot L} - 1 \quad (7)$$

where L is henries, and is the inductance of the thyristor controlled reactor or inductor shown in FIG. 10, for example. The maximum flux linkages that the reactor can have occurs at full conduction of the thyristors and is equal to IM·L. When the reference flux linkage $\lambda R$ equals this value, i.e. (IM·L), we find from equation (7) that $$\cos(\theta C/2) = 0 \quad (8)$$

or $$\theta C = \pi \text{(radians)} \quad (9)$$

when $\lambda R = 2IM \cdot L$, equation (7) shows that the conduction angle is zero. Thus the total range of conduction angle is encompassed for $\lambda R$ in the range $$IM \cdot L \leq \lambda R \leq 2IM \cdot L \quad (10)$$

Figure 7:
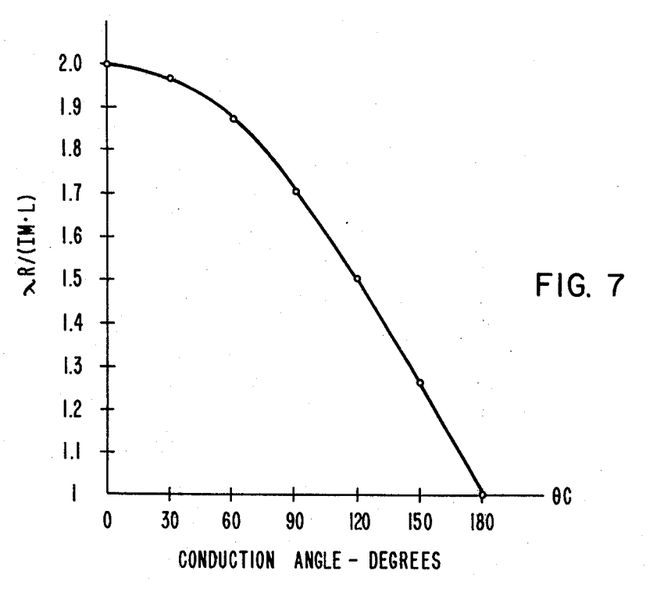
FIG. 7 shows a plot of conduction angle as it relates to flux linkages from a voltage integrator.

FIG. 7 shows a plot of a function of the reference flux linkages $\lambda R$ for various conduction angles $\theta C$.

Figure 8:
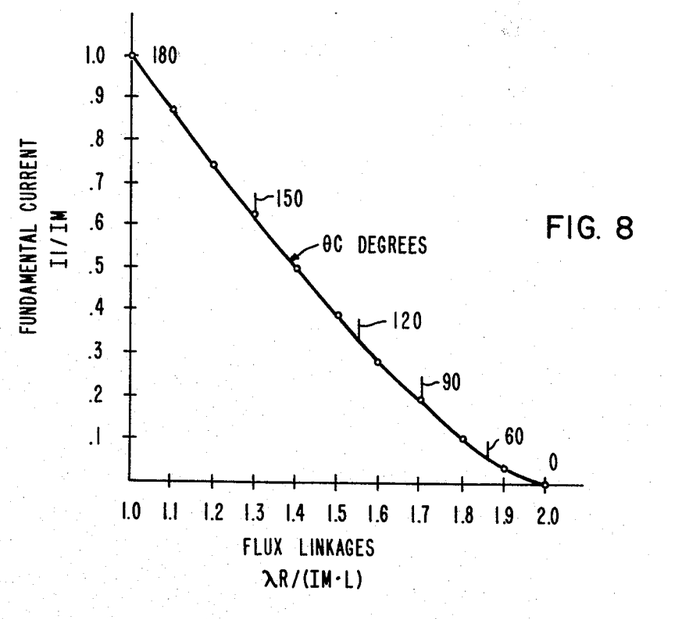
FIG. 8 shows the interrelationship of fundamental current to flux linkages.

Equations (2) and (7) may be considered as parametric equations which relate I1/IM to $\lambda R/(IM \cdot L)$ through the parameter $\theta C$. A graphical plot of the above-mentioned relationship may be derived from FIGS. 6 and 7. Such a plot is shown in FIG. 8. Each point on the curve of FIG. 8 has an associated conduction angle $\theta C$ which is shown on the curve in electrical degrees at several points. Of particular significance is the fact that the curve is quite linear over the range extending from 20% to 100% of the fundamental current I1. This basic linearity between the fundamental current I1 and the flux linkage reference $\lambda R$ makes this type of thyristor firing angle control quite suitable for any feedback system.

Another interesting feature of this control is the fact that an increase in voltage across the controlled reactor causes the reactor to fire early and to increase the fundamental current component. Such action tends to reduce the increased voltage so that the firing angle control has built-in negative feedback independent of the feedback of the main feedback path via the error-signal generator shown in FIG. 10.

Figure 9B:
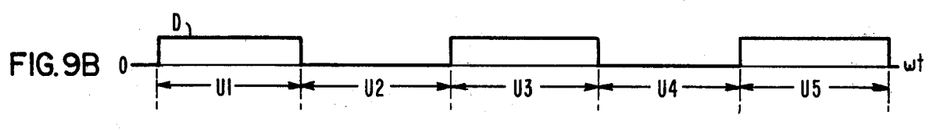
FIG. 9B shows the D timing signal for the timing apparatus of FIG. 10.
Figure 9C:
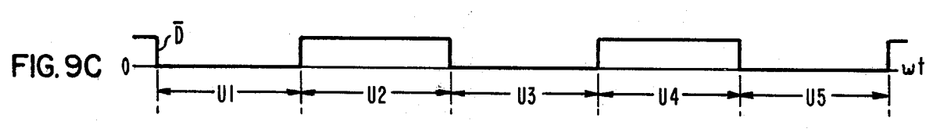
FIG. 9C shows the $\overline{D}$ timing signal for the timing apparatus of FIG. 10.
Figure 9D:
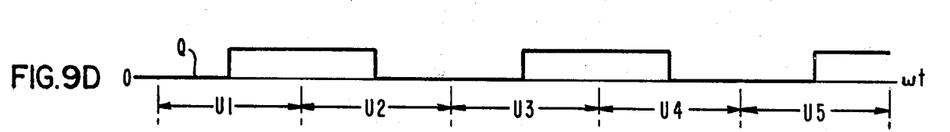
FIG. 9D shows the Q timing signal for the timing apparatus of FIG. 10.
Figure 9E:
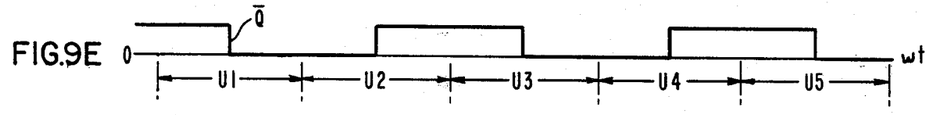
FIG. 9E shows the $\overline{Q}$ timing signal for the timing apparatus of FIG. 10.
Figure 9F:
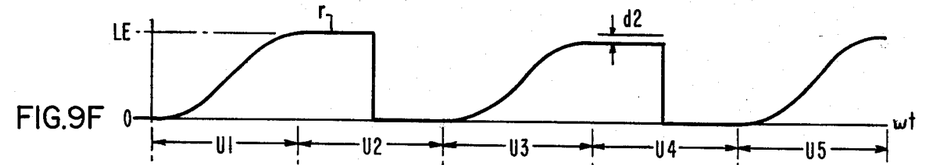
FIG. 9F shows voltage integrations of the positive half cycles of the voltage wave of FIG. 9A.
Figure 9G:
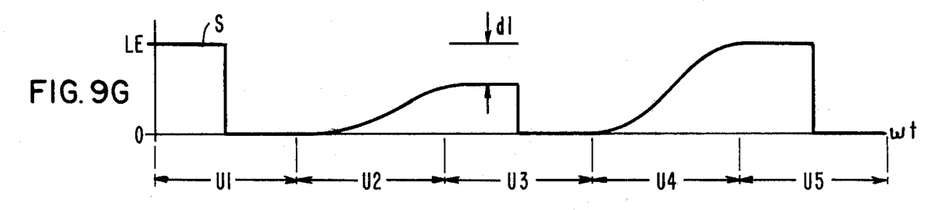
FIG. 9G shows voltage integrations of the negative half of the voltage wave of FIG. 9A.
Figure 9H:
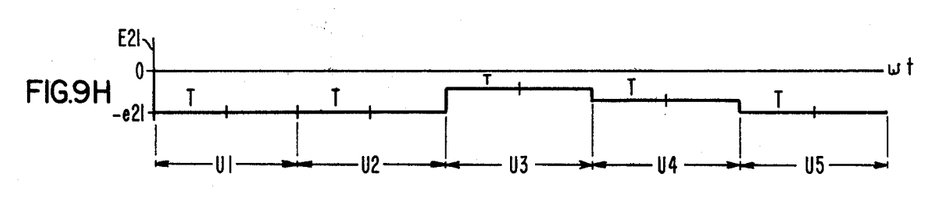
FIG. 9H shows the half period average levels for the voltages of FIGS. 9F and 9G.
Figure 9I:
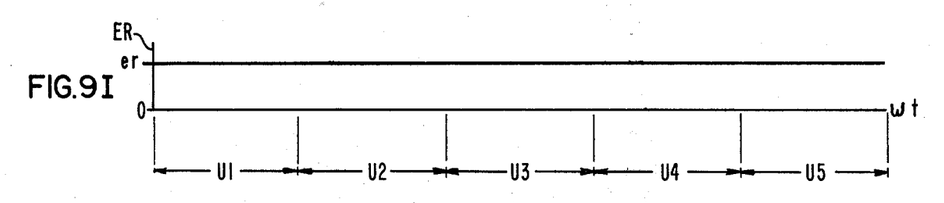
FIG. 9I shows the reference signal ER for the Summator of FIG. 10.
Figure 9J:
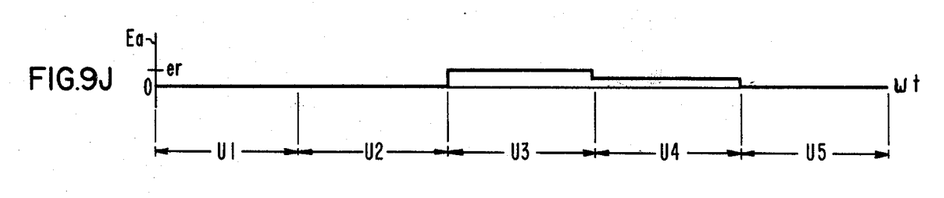
FIG. 9J shows the error signal Ea of the apparatus of FIG. 10.
Figure 9K:
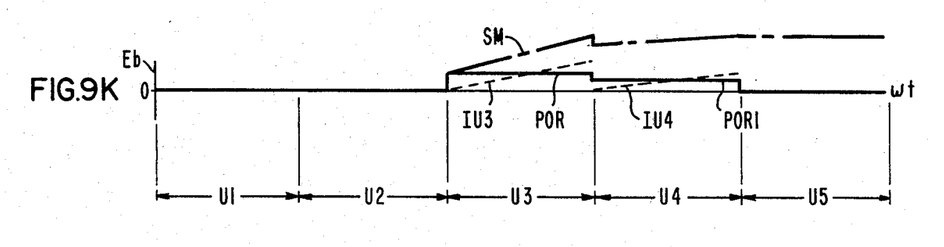
FIG. 9K shows the proportional and integral control output signal Eb for the apparatus of FIG. 10.
Figure 9L:
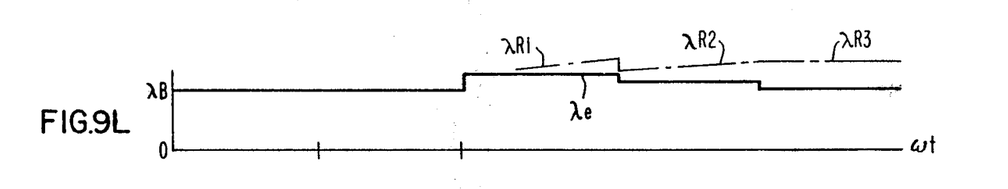
FIG. 9L shows the flux linkage signal λR for the apparatus of FIG. 10.
Figure 9M:
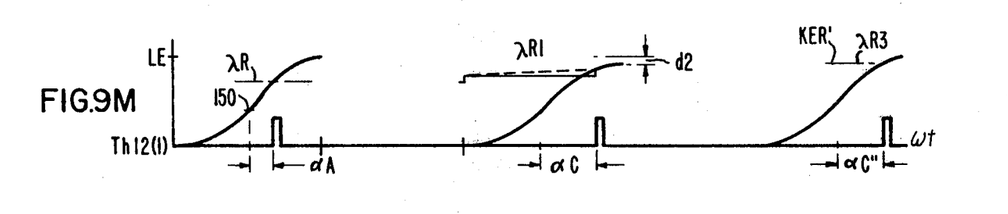
FIG. 9M shows a comparison of the signals from FIG. 9L with the integrated signals of FIG. 9F.
Figure 9N:
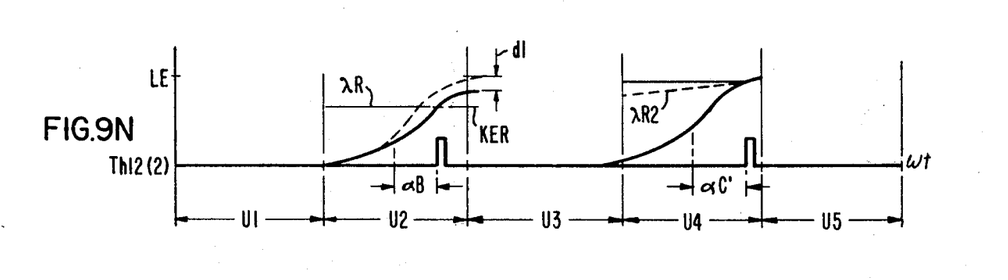
FIG. 9N shows the comparison of the signals of FIG. 9L with the integrated signals of FIG. 9G.

Referring now to FIGS. 9A through 9P and 10 taken together, an implementation circuit and the associated waveforms for the concepts taught therein is shown. The apparatus of FIG. 10 shows a VAR generator that is responsive to error signals which are derived by comparing terminal voltages or some function thereof with a reference. Once the error signal is obtained, it is processed to provide proportional and integral control signal which in turn becomes an input to a firing angle control circuit. The voltages e1, e2, and e3 of FIG. 10 are line-to-neutral voltages which are basically sinusoidal quantities with the power frequency. The reason the voltages are not pure sinusoids is the presence of system disturbances and the fact that the reference voltage +ER may change slowly with time. For example, it may be desirable to change the voltage level at the network terminals. Hence, ER may change from one constant value to another. It is convenient to think of the voltages e1, e2, and e3 as amplitude modulated waves with a carrier frequency equal to the power line frequency. The function of the error generator of the apparatus of FIG. 10 which will be described in detail hereinafter, is to demodulate the voltage signals and generate an error signal shown as Ea in FIG. 10, by comparing the demodulated signal with a reference signal ER. The frequency spectrum of ER is generally band limited and contains components less than the carrier frequency. The error processor portion of the circuit generally provides an output signal Eb which is the sum of two terms. The first term is proportional to the error signal Ea and the other is proportional to the integral of the error signal Ea. Because of stability considerations, it may be essential that the proportional signal be passed through a low pass filter (not shown herein). The thyristor firing angle control portion of the apparatus of FIG. 10 converts the input signal Eb to a firing angle for the appropriate thyristor. This process will occur each half cycle of the voltage wave. The above sequence of control is duplicated three times to provide the required control signal for each of the three thyristor control reactors or inductors if balanced line-to-line voltages are to be obtained in the three phase system. FIG. 10 shows the construction of a VAR generator for a three phase electrical system. Line-to-ground voltages V1, V2 and V3 exist for each of the three lines, LINE 1, LINE 2 and LINE 3 shown in FIG. 10. The currents that flow in the lines are identified as IS1, IS2 and IS3 respectively. In each case the line-to-line voltage is identified as e12, e23 and e31 for each of the three phases. The line-to-ground voltages at the terminals 9a, 9b and 9c are e1, e2 and e3 respectively. These voltages are supplied to a control system CS for a VAR regulator VAR REG. The VAR regulator may be of the type described in detail in previously described U.S. Pat. Nos. 3,999,117; 3,987,360 and 4,000,455. Basically, it comprises three fixed capacitors CC1–CC3 and three parallel connected inductors L1, L2 and L3 respectively. Each of the inductors has a bidirectional thyristor switch TH12, TH23 and TH31, respectively, which allows the amount of inductor current to be controlled by the gates of the thyristor switches. The six lines which are connected to the gates of the thyristor switches are interconnected to the control system CS at three thyristor firing angle generators TFAGα12, TFAGα23 and TFAGα31, respectively. The control system CS comprises an error generator for each of the thyristor firing angle generators. As an example, thyristor firing angle generator TFAGα12 is fed by an error generator ER12 GEN. In the same manner, thyristor firing angle generator TFAGα23 is fed by error signal generator ER23 GEN, and thyristor firing angle generator TFAGα31 is fed by error signal generator ER31 GEN. For purposes of convenience of illustration, the operation of only one error generator ER12 GEN and one thyristor firing angle generator TFAGα12 will be described. The other two error generators are similar and the other two thyristor firing angle generators are similar and consequently are not shown in their entirety for purposes of simplicity. Error generator ER12 GEN is supplied by voltages e1 and e2. In a like manner, error generator ER23 GEN is supplied by voltages e2 and e3, and error generator ER31 GEN is supplied by voltages e3 and e1. The error generator ER12 GEN takes the two voltages e1 and e2 and subtracts them one from the other to form the voltage function e1 minus e2 (e1−e2). The subtraction is performed in an amplifier S1 where signal e2 is subtracted from signal e1 providing the requisite output signal e1 minus e2. This signal is then provided to the integrator 105 and to the integrator 110 by way of inverted 64. This signal is also provided to a level detector 74 which produces a logic one when e1 minus e2 is greater than zero and a logic zero when e1 minus e2 is less than zero. This latter signal is the D logic signal which is shown in FIG. 9B. FIG. 9C shows the complementary logic signal $\overline{D}$. Signal e1 minus e2 is additionally provided to a phase shifting amplifier 95 where it is phase shifted by 90° and thence provided to another level detector 44 which generates the Q logic signals. The Q logic signal is shown in FIG. 9D. Similarly, the complementary logic signal $\overline{Q}$ is shown in FIG. 9E. The signals D, $\overline{D}$, Q, and $\overline{Q}$ are provided to other portions of the error generator circuit ER12 GEN for control thereof. As an example, the D and Q logic signals and their complements $\overline{D}$ and $\overline{Q}$ are used to control the modes of integrators 105 and 110 as well as the mode of the track and store amplifier 71 through the respective mode control modules 105C, 110C and 71C. Integrator 105 has its modes controlled so that it integrates the positive half cycles of the voltage signal e12 = e1−e2 shown in FIG. 9A. Integrator 110 has its modes controlled so that it integrates the negative half cycles of the voltage signal e12 shown in FIG. 9A. The output of the integrator 105 is represented by the signal r and the output of integrator 110 is represented by the signal S. These signals are shown in FIGS. 9F and 9G, respectively. Integrator 105 is placed in the operate state by the presence of the control signal D on the "OP" input of control module 105C. On the other hand, the integrator 105 is placed in a hold state by the concurrent presence of the input signal $\overline{D}$ and Q on the AND gate 2E which supplies the "IC" inputs of control module 105C. Finally the integrator 105 is placed in the initial condition by the presence of the signals $\overline{D}$ and $\overline{Q}$ on AND gate 2E. As mentioned, the latter two signals are provided by utilizing the AND gate 2E in conjunction with the logic signals. The output of AND gate 2E is also provided by way of an inverter IV1 to one input of an AND gate 2F. In a like manner, the mode of operation for the integrator 110 is such that operation occurs when the $\overline{D}$ signal is provided on the "OP" input of control module 110C. A hold occurs when the D signal and the $\overline{Q}$ signal is provided concurrently to the "IC" input of control module 110C by way of AND gate 4A. Finally the initial condition occurs when the D signal and the Q signal are provided by way of AND gate 4A to the latter mentioned input. As was the case with respect to the control for integrator 105, the output of AND gate 4A is also provided by way of an inverter IV2 to the other input of the AND gate 2F. The output of the AND gate 2F is provided by way of an inverter IV3 to the track input terminal "T" the control module 71C of the track and store amplifier 71. To be more specific track and store amplifier 71 is in the track mode when the T input of control module 71C is at a digital one, and is in the store mode when the input T is at a digital zero. Every time either of the integrators 105 or 110 is in a hold mode, the track and store amplifier 71 should be in a track mode. Stated another way, whenever either integrator 105 or 110 is in its initial condition, the track and store amplifier should be in its store mode.

The signal output of the integrator 105, that is the r signal, should be applied to the track and store amplifier 71 by way of switch 104 when the integrator 105 is in a hold state. AND gate 2A implements this requirement. Similarly, the S signal should be applied to the track and store amplifier 71 by way of switch 109 when the integrator 110 is in the hold state. And gate 3A implements this requirement. A depiction of the operation of the integrators with respect to the timing waves D, $\overline{D}$, Q, and $\overline{Q}$ is clearly set forth in FIGS. 9F and 9G when compared against FIGS. 9B through 9E. The output signals r and S from the integrators 105 and 110, respectively as gated through control elements or switches 104 and 109, respectively, are stored as the integrated half period voltage wave averages in each case. The output from the track and store amplifier 71 is identified by the reference symbol E21 and is shown pictorially in FIG. 9H for one set of operating conditions. In general, the track and store amplifier 71 tracks the output of an appropriate integrator for one half of one half cycle as indicated by the T's in FIG. 9H and stores that signal for the other half of the same half cycle. The signal E21 which is inverted from the positive by the operation of the amplifier 71 so that it becomes a negative signal is compared against a reference signal ER in a summing amplifier SUM. The output of the summing amplifier SUM is identified as the signal Ea as is shown in FIG. 9J. A switch may be provided between the output of the summing amplifier SUM and the input of the proportional and integral control unit 101. The output of the proportional and integral control unit 101 is designated Eb and is shown for one operating example in FIG. 9K. Eb is supplied to the thyristor firing angle generator TFAGα12 where it is supplied to a summing amplifier SUM2. Also supplied to the summing amplifier SUM2 by way of another input thereof is a biasing signal λB which is provided by a SET BIAS functional block. The output of the summing amplifier SUM2 is the signal λR which is proportional to the sum of the signal Eb and the signal λB. The signal λR which is measured in units of flux linkage, is supplied as input to a negative comparator 125 and a positive comparator 126. Signal λR is compared against output signals S and r. The output of the comparator 125 provides the thyristor control signals TH12(1) while the output of the comparator 126 provides the thyristor control signal TH12(2). The state of the comparators is determined by the presence of signals on the lines r and S. FIG. 9M shows a comparison of the positive half wave signals r with the λR signals from FIG. 9L, while FIG. 9N shows a similar comparison between the negative integrated signals of FIG. 9G and the λR signal of FIG. 9L. The occurrence of comparison crossover triggers the pulses which control the phase back angles alpha (α) which in turn control the amount of current ICL12 as shown in FIG. 9P. FIG. 9P shows the relationship of the controlled inductor current iCL12 and the fixed capacitive current ICC12. The fundamental component iCL12(F) of the pulsed inductor current iCL12 is added vectorially to the fixed capacitor current iCC12 to provide the compensating current iC12. This latter current is provided by way of the VAR regulator VAR REG. to the appropriate transmission lines to provide sufficient compensating VAR's to maintain the desired voltage regulation.

ILLUSTRATIVE EXAMPLE

By way of illustration, the operation of the apparatus of FIG. 10 will be described for compensation or regulation necessitated as a result of a reduction in voltage e12. This example covers five one half cycle of the voltage waveform e12. These five half cycles are identified sequentially as U1 through U5. The positive voltage half cycle e12 during the period U1 represents a steady state condition prior to the reduction in the voltage e12. In the timing interval U1 the voltage wave e12 is positive, the output control signal D is in the one state while the $\overline{D}$ signal is in the zero state, and the Q signal is in the zero state for the first half of interval U1 and in the one state for the second half of the interval U1. Conversely, the $\overline{Q}$ signal is in the one state for the first half of the interval U1 and in the zero state for the latter half. At this time, the D signal (one) at the "OP" control terminal for the integrator 105 causes the voltage e12 to be integrated such as is shown in FIG. 9F. This integrated voltage signal is sampled at the end of the interval U1 and produces a stored level LE. Concurrent with the first portion of the latter ingetration, a level LE from a previous sampling of the integrator 110 is stored in the hold cycle of integrator 110 as is shown in FIG. 9G. This latter signal is tracked and then stored for the remaining portion of U1 as a value −e21 as shown in FIG. 9H. The latter tracking and storing is accomplished by sample and hold device 71. Stored signals LE is representative of what happened in a previous half cycle (not shown). The reference signal ER shown in FIG. 9I is maintained at a specific value er which may be changeable. The error signal EA, which is the sum of the reference signal ER and the negative signal −e21, is zero at this time as no error is present, i.e., the reference signal equals the negative signal −e21. Likewise, the signal EB is zero and the signal λR is at a bias value λB. When the integrated signal from FIG. 9F is compared with the level λR by the comparator 125, as is shown in FIG. 9M, a phase back angle αA is generated at line Th12 which causes the maximum available value of inductor current iCL12(MAX) of FIG. 9A to be reduced to the value iCL12 of FIG. 9P. This value has been present prior to this time during previous half cycles. As is shown in FIG. 9P, the presence of the fundamental inductor current iCL12(F) added vectorially to the fixed capacitor current iCC12 provides a net capacitive component of current iC12 which is utilized to attempt to maintain the voltage e12 at the value shown in the interval U1, all other things being equal.

In interval U2, the voltage value e12 in the negative half cycle is deliberately reduced by an amount Δ1 for the purpose of illustration. At this time, the presence of the $\overline{D}$ control signal causes the integrator 110 to begin integrating. The integration signal is shown in FIG. 9G for the interval U2. It will be noted that it produces a resultant final value which is lower than the level LE by an incremental amount d1 as shown in FIG. 9N. This is due to the reduction in the value of line voltage e12 by the increment Δ1. The half period average voltage value as derived from the previously described integration of the positive voltage signal e12 during the period U1 is tracked and stored as an output of the track and store amplifier 71 and is now depicted as the signal −e21. This signal is compared with the constant reference signal ER and produces a resultant error signal Ea which remains at zero. Consequently the value of signal Eb shown in FIG. 9K remains zero. As a result, the bias signal λB shown in FIG. 9L remains unchanged. However, this latter signal is now compared against the integrated negative voltage signal shown in FIG. 9G for the reduced voltage e12 during the interval U2. The mere fact that the voltage has dropped by an amount Δ1 thus producing a lower integral causes the phase back angle αB of FIG. 9N to be different than the phase back angle αA shown in FIG. 9M. This has an immediate negative feedback effect even though the level λR has not changed. This is because feedback is a function of a change in the level λR or a change in the instantaneous level of integration of the voltage e12, either one of which may cause the conduction angle of the thyristor to change accordingly. In this case, the main reason that the angle αB is significantly larger than the angle αA is due to a decrease in the value of the integral of the negative half cycle of voltage e12 during the interval U2. This reduces the inductive component of current in the inductor as shown in FIG. 9P by a significantly smaller current pulse iCL12 which in turn provides for a significantly larger amount of capacitive current iC12 for correction or regulation of the line voltage e12.

The incremental amount of feedback correction due to the increase in the value of capacitive current iC12 starting in interval U2 causes the magnitude of next following positive half wave of voltage e12 to be significantly larger than the previous half wave voltage magnitude so as to reduce the error between the desired voltage and the actual voltage to an amount Δ2, which is less than Δ1. The control signals as shown in FIGS. 9B through 9E during interval U3 cause an appropriate integration of this latter half wave voltage producing an r output signal as shown in FIG. 9F which produces a significantly smaller error d2 between the actual stored value and the value LE as shown in FIG. 9M. Concurrently, the output of the previous integration of the negative half cycle of voltage, as shown in FIG. 9G, during the interval U2 provides a reduction in the error signal. This is shown in FIG. 9H during the interval U3. This signal when added to the error signal Er of FIG. 9I produces a smaller proportional error level Ea as shown in FIG. 9J during the interval U3. This error signal is provided to the proportional and integral control unit 101 where a proportional level POR is provided as one component of the output signal Eb and an integrated error signal IU3 is provided as another component of the output signal Eb. These two components are summed as shown in FIG. 9K during the interval U3 to provide a resultant total error signal SM. Signal Eb is provided to the summing amplifier SUM2. In amplifier SUM2 it is converted to a resultant flux linkage signal λR1 which is the sum of the bias signal λB, the proportional component of flux linkage λe and the integral portion of flux linkage. The latter signal λR1 is provided to the comparator 126 where it is compared against the integration of the voltage signal e12 during the interval U3 as is shown in FIG. 9F. Signal r therefore cooperates with signal λR1 during interval U3 to provide a phase back angle for the thyristor circuit of αC which is even larger than the previous phase back angle αB. This further reduces the amount of inductive current iCL12 flowing through the inductive element L1 of FIG. 10 thus providing a fundamental current iCL12(F) which is added to the fixed capacitive current iCC12 to provide a larger component of capacitive current iC12. This latter current is provided to the lines LINE 1 and LINE 2 to almost completely eliminate the effect of the original reduction Δ1 in voltage which had taken place during interval U2.

During interval U4 the almost completely restored voltage value e12 is integrated as is shown in FIG. 9G according to the disposition of the timing signals shown in FIGS. 9B through 9E to provide the half-period average signal E21 as shown in FIG. 9H which indicates that almost full voltage correction has taken place. The half-period average signal is compared with the fixed reference value ER shown in FIG. 9I to produce a very small relative error signal as shown in FIG. 9J during the interval U4. This has the effect of reducing the proportional error POR1 and the integral IU4 of the proportional error POR1 as is shown in FIG. 9K. The resultant signal SM shows a downward discontinuity at the time interface between the intervals U3 and U4 which gradually rises to approximately the value that had been attained at the end of the interval U3. This is represented by a similar gradually increasing flux linkage signal λR2 in FIG. 9L. This latter signal is compared with the integral of the voltage as shown in FIG. 9N during the interval U4 to provide a phase back signal αC' which is almost the same as the signal αC shown in FIG. 9M during the interval U3. This causes only a very small change in the amount of inductor current iCL12 which flows through the inductor L1 of FIG. 10. This small change means that the compensating current iC12 is approximately the same as it was in the preceding half cycle. This means that the voltage change in interval U5 will be relatively small.

During interval U5 the appropriate integration of voltage e12 as shown in FIG. 9F leads to a half-period average signal E21 which is almost the same as the half-period average signal E21 shown in FIG. 9H during the original interval U1. This leads to an error EA as shown in FIG. 9J during interval U5 which is almost zero. The net effect of this is to produce a new level of output voltage Eb shown in FIG. 9K of interval U5 which generally remains constant until the voltage e12 is once again changed. The difference between the level of the signal Eb of FIG. 9K during the interval U1 and the same signal during the interval U5 represents the amount of voltage which has been provided to the system to correct for the incremental change Δ1 of the line voltage e12 during the interval U2. The resultant flux linkage signal λR3 is compared with the integrated signal shown in interval U5 of FIG. 9F to provide a phase back signal αC'' which is almost the same as signal αC' thus causing the inductive component of current iCL12 to be approximately the same as it was in the preceding two half cycles.

It is to be understood with respect to the previous explanation that the error signal Eb is theoretically never completely eliminated but approaches zero with time. Of course, for all practical purposes, the error can be thought of as being eliminated in three to ten cycles in accordance with the overall system dynamics and because the capability of measuring devices to sense errors of relatively small magnitude diminishes significantly after appreciable correction has been made. A key element in reducing the error is the cooperation of the proportional part and the integral part of the control element 101. It is to be understood with respect to the various embodiments of this invention that they need not be used simultaneously. As an example, the half period average technique need not be used with the saturable firing angle technique or vice versa. They are shown utilized together merely for the purpose of illustration. It is also to be understood that the various implementing means shown herein are not limiting. It is also to be understood that the various waveshapes shown in FIGS. 9A through 9P are not necessarily drawn to scale, relative to each other or to expected values in actual operating system. As an example, the voltages and currents shown in FIG. 9A may have different amplitudes than are shown therein and each may be different than the other. It is also to be understood that the phase shifting method shown with respect to the generation of the Q and $\overline{Q}$ signals is preferably done in two stages of 45° phase shift to eliminate certain problems associated with a single 90° phase shift in one stage. It is also to be understood that the integral and proportional control unit 101 is provided to improve dynamic response, that is to make the system operate faster. It may also provide a filtering effect. Furthermore, it is a stabilizing portion of the closed loop feedback system. The integral control portion has the effect of eliminating a steady-state error. It is also to be understood that the two modes of phase correction previously alluded to do not need to operate simultaneously for effective control. As was mentioned previously, one mode of firing angle correction is associated with the fact that the bias level of flux linkage λR remains the same, while the integral of the voltage wave is changed. Another mode of control lies in the fact that the integral of the voltage may remain relatively constant while the bias level λR changes. Of course in some embodiments of the invention, both tend to occur during the same correcting operation.

The apparatus taught with respect to the embodiment of this invention has many advantages. One advantage lies in the fact that an integrator will not tolerate a steady-state error and always moves to reduce the error to zero. Consequently the utilization of an integrator in the feedback loop operates to reduce errors and regulate voltage effectively and quickly. Another advantage lies in the fact that two modes of feedback are provided, either of which may be effective. The first provides regulation or correction by maintaining a relatively fixed flux linkage or error signal and changing the integral of the voltage and the second mode utilizes a relatively fixed voltage integral while changing the level of the flux linkage. The former case provides the additional advantage of quick negative feedback in the half cycle in which a change in voltage is detected. Of course, it is to be realized that these disturbances affect the regulation of voltage and are acted upon by the system to correct or regulate the voltage. Another advantage lies in the fact that the relationship of flux linkage λR to fundamental current I1 as disclosed in this application is relatively linear over a significant portion of the conduction angle of the thyristor control. Another advantage lies in the fact that if both concepts of the saturable firing angle control and the half wave average voltage are implemented as shown in FIG. 10 the integrators 105 and 110 provide two of the necessary signals. The integration portion of the signal, i.e., r or S, is provided to the appropriate comparators for comparison purposes where the end value of the integrated signal is tracked and stored to provide the half period average voltage previously described. Consequently, it may be said that the same equipment that generates the half period average signal for the error generator also generates the λ signal for firing the thyristors although the ultimate effect of each takes place in different intervals. Another advantage lies in the fact that the curve comparing λR to I1 shown in FIG. 8 is quite linear over a range extending from 20% to 100% of the fundamental current. This basic linearity between the fundamental current I1 and the flux linkage reference λR makes the aforementioned and disclosed type of thyristor firing angle control suitable for a feedback system. Another advantage lies in the fact that an increase in voltage across the controlled reactor or inductor causes the reactor to fire earlier and to increase the fundamental current component. This action tends to reduce the increased voltage so that the firing angle control has built in negative feedback independent of the feedback of the main feedback path which includes the error signal generator. Another advantage lies in the fact that the switch SW may be opened to interrupt the main feedback path and allow independent adjustment or control of the line voltage e12, for example by merely changing the value ER. This of course provides another way of increasing or decreasing the voltage across power lines. Other advantages are: the system has high immunity to noise because of the integration techniques, the system does not need a new linear function of α generator to operate, each phase can be compensated for individually, the control system is relatively insensitive to frequency change and the system is relatively fast.

We claim:

1. A voltage regulator for an alternating current electrical distribution system which supplies electrical power to a pair of terminals, wherein said distribution system has an apparent impedance disposed in series circuit relationship with one of said terminals, said impedance affecting the voltage at said terminals as a function of the amount of current flowing through said impedance comprising:

(a) reference means for fixing a reference voltage for said terminals;

(b) determining means for measuring the actual voltage at said terminals and providing an output signal indicative of the positive and negative half cycles of said actual voltage, first comparator means for providing a positive first comparator output control signal for positive half cycles of said actual voltage and a negative first comparator output control signal for negative half cycles of said actual voltage, a second comparator means for providing a positive second comparator output control signal which is ninety degrees phase shifted from said positive first comparator output control signal and for providing a negative second comparator output control signal which is ninety degrees phase shifted from said negative first comparator output control signal, integrator means interconnected with the output of said determining means and having a control terminal interconnected with said first and second comparator means for integrating said actual voltage when said positive first comparator output control signal is present and for holding an integration signal representative of said integration only during a condition when said negative first comparator output control signal and said positive second comparator output control signal are concurrently present, track and store means interconnected with the output of said integrator means for tracking said integration means output signal during the time of said condition, and at a time thereafter providing as an output a signal related to the integral of said actual voltage;

(c) third comparator means including summing means interconnected with said reference means and said track and store means for comparing said reference voltage with said integral of said actual voltage and for providing a third comparator means output signal related to the difference therebetween; and (d) reactive current source means interconnected with said comparator means and said terminals to provide compensating reactive electrical current to said terminals of sufficient magnitude and direction as determined by said comparator means output signal to change the amount of said current flowing through said impedance to a value which causes said difference between said actual voltage and said reference voltage to be generally zero.

2. A voltage regulator for an alternating current electrical distribution system which supplies electrical power to a pair of terminals, wherein said distribution system has an apparent impedance disposed in parallel circuit relationship with said terminals, said apparent impedance affecting the voltage at said terminals as a function of the amount of current flowing through said impedance comprising:

(a) reference means for fixing a reference voltage for said terminals;

(b) determining means for measuring the actual voltage at said terminals and providing an output signal indicative of the positive and negative half cycles of said actual voltages, first comparator means for providing a positive first comparator output control signal for positive half cycles of said actual voltage and a negative first comparator output control signal for negative half cycles of said actual voltage, a second comparator means for providing a positive second comparator output control signal which is ninety degrees phase shifted from said positive first comparator output control signal and for providing a negative second comparator output control signal which is ninety degrees phase shifted from said negative first comparator output control signal, integrator means interconnected with the output of said determining means and having a control terminal interconnected with said first and second comparator means for integrating said actual voltage when said positive first comparator output control signal is present and for holding an integration signal representative of said integration only during a condition when said negative first comparator output control signal and said positive second comparator output control signal are concurrently present, track and store means interconnected with the output of said integrator means for tracking said integration means output signal during the time of said condition, and at a time thereafter providing as an output a signal related to the integral of said actual voltage;

(c) third comparator means including summing means interconnected with said reference means and said track and store means for comparing said reference voltage with said integral of said actual voltage and for providing a third comparator means output signal related to the difference therebetween; and (d) reactive current source means interconnected with said third comparator means and said terminals to provide compensating reactive electrical current to said terminals of sufficient magnitude and direction as determined by said third comparator means output signal to change the amount of said current flowing through said impedance to a value which causes said difference between said actual voltage and said reference voltage to be generally zero.

3. A voltage regulator for a two conductive element alternating current electrical system of the type which has an impedance disposed in series circuit relationship with one of the conductors, where each conductor has a voltage value relative to a given voltage potential at any instant of time and where the voltage across the impedance is a function of the magnitude of electrical current flowing through the impedance, comprising:

(a) reference means for setting a desired voltage value between said conductors;

(b) determining means for sensing the actual voltage between said conductors at any instant of time and providing an output signal indicative of the positive and negative half cycles of said actual voltage, first comparator means for providing a positive first comparator output control signal for positive half cycles of said actual voltage and a negative first comparator output control signal for negative half cycles of said actual voltage, a second comparator means for providing a positive second comparator output control signal which is ninety degrees phase shifted from said positive first comparator output control signal and for providing a negative second comparator output control signal which is ninety degrees phase shifted from said negative first comparator output control signal, integrator means interconnected with the output of said determining means and having a control terminal interconnected with said first and second comparator means for integrating said actual voltage when said positive first comparator output control signal is present and for holding an integration signal representative of said integration only during a condition when said negative first comparator output control signal and said positive second comparator output control signal are concurrently present, track and store means interconnected with the output of said integrator means for tracking said integration means output signal during the time of said condition, and at a time thereafter providing as an output a signal related to the integral of said actual voltage;

(c) third comparator means including summing means interconnected with said reference means and said track and store means for comparing said desired voltage value with said track and store means output signal and for providing a third comparator means output signal related to the difference therebetween; and (d) reactive current source means interconnected with said third comparator means and said electrical system for responding to said third comparator means output signal for providing reactive electrical current to said electrical system of sufficient magnitude and direction to change the voltage across said impedance to a value which causes the difference between said desired voltage value and said actual voltage to be generally zero.

4. A voltage regulator for a two conductive element alternating current electrical system of the type which has an impedance connected between the conductors, where each conductor has a voltage value relative to a given voltage potential at any instant of time and where the voltage across the impedance is a function of the magnitude of electrical current flowing through the impedance, comprising:

(a) reference means for setting a desired voltage value between said conductors;

(b) determining means for sensing the actual voltage between said conductors at any instant of time and providing an output signal indicative of the positive and negative half cycles of said actual voltage, first comparator means for providing a positive first comparator output control signal for positive half cycles of said actual voltage and a negative first comparator output control signal for negative half cycles of said actual voltage, a second comparator means for providing a positive second comparator output control signal which is ninety degrees phase shifted from said positive first comparator output control signal and for providing a negative second comparator output control signal which is ninety degrees phase shifted from said negative first comparator output control signal, integrator means interconnected with the output of said determining means and having a control terminal interconnected with said first and second comparator means for integrating said actual voltage when said positive first comparator output control signal is present and for holding an integration signal representative of integration only during a condition when said negative first comparator output control signal and said positive second comparator output control signal are concurrently present, track and store means interconnected with the output of said integrator means for tracking said integration means output signal during the time of said condition, and at a time thereafter providing as an output a signal related to the integral of said actual voltage;

(c) third comparator means including summing means interconnected with said reference means and said track and store means for comparing said desired voltage value with said track and store means output signal and for providing a third comparator means output signal related to the difference therebetween; and (d) reactive current source means interconnected with said third comparator means and said electrical system for responding to said third comparator means output signal for providing reactive electrical current to said electrical system of sufficient magnitude and direction to change the voltage across said impedance to a value which causes the difference between said desired voltage value and said actual voltage to be generally zero.

5. A voltage regulator for a two conductor alternating current electrical transmission line of the type which supplies power to a pair of terminals where a portion of the net impedance of the line between a source of power and the terminals appears to be an inductor connected in series with one of the conductors, where each conductor has a voltage value to ground at any instant of time and where the net voltage across the apparent inductor is a function of the magnitude of current flowing through the conductor, comprising:

(a) reference means for setting a desired voltage value between said terminals;

(b) determining means for sensing the actual voltage between said terminals at any instant of time and providing an output signal indicative of the positive and negative half cycles of said actual voltage, first comparator means for providing a positive first comparator output control signal for positive half cycles of said actual voltage and a negative first comparator output control signal for negative half cycles of said actual voltage, a second comparator means for providing a positive second comparator output control signal which is ninety degrees phase shifted from said positive first comparator output control signal and for providing a negative second comparator output control signal which is ninety degrees phase shifted from said negative first comparator output control signal, integrator means interconnected with the output of said determining means and having a control terminal interconnected with said first and second comparator means for integrating said actual voltage when said positive first comparator output control signal is present and for holding an integration signal representative of said integration only during a condition when said negative first comparator output control signal and said positive second comparator output control signal are concurrently present, track and store means interconnected with the output of said integrator means for tracking said integration means output signal during the time of said condition, and at a time thereafter providing as an output a signal related to the integral of said actual voltage;

(c) third comparator means including summing means interconnected with said reference means and said track and store means for comparing said desired voltage value with said track and store means output signal and for providing a third comparator means output signal related to the difference therebetween; and (d) reactive current source means interconnected with said third comparator means and said conductors for responding to said third comparator means output signal for providing reactive electrical current to said conductors of sufficient magnitude and direction to change the voltage across said apparent impedance to a value which causes the difference between said desired voltage value and said actual voltage to be generally zero.

6. The combination as claimed in claim 5 wherein said two conductors are part of a polyphase electrical system.

7. The combination as claimed in claim 6 wherein said polyphase electrical system comprises a three phase electrical system.

8. The combination as claimed in claim 5 wherein said reactive current source means includes a thyristor controlled inductor connected in parallel with a fixed capacitor which is disposed between said conductors for providing said reactive current as a function of the firing angle of said thyristor, where said thyristor firing angle is a function of said integral of said actual voltage.

9. The combination as claimed in claim 8 wherein said two conductors are part of a three phase electrical system.

10. A voltage regulator for a two conductor alternating current electrical transmission system of the type which supplies power to a pair of terminals, where line reactance appears between a source of power and the terminals, where each conductor has a voltage value to ground at any instant of time and where the net voltage across the line reactance is a function of the magnitude of load current flowing through conductors, comprising:

(a) determining means including measuring means interconnected with said transmission system for determining the actual voltage between two of said conductors and for providing an output signal indicative of the positive and negative half cycles of said actual voltage, first comparator means for providing a positive first comparator output control signal for positive half cycles of said actual voltage and a negative first comparator output control signal for negative half cycles of said actual voltage, a second comparator means for providing a positive second comparator output control signal which is ninety degrees phase shifted from said positive first comparator output control signal and for providing a negative second comparator output control signal which is ninety degrees phase shifted from said negative first comparator output control signal, integrator means interconnected with the output of said determining means and having a control terminal interconnected with said first and second comparator means for integrating said actual voltage when said positive first comparator output control signal is present and for holding an integration signal representative of said integration only during a condition when said negative first comparator output control signal and said positive second comparator output control signal are concurrently present, track and store means interconnected with the output of said integrator means for tracking said integration means output signal during the time of said condition and at a time thereafter providing as an output a signal related to the integral of said actual voltage;

(b) third comparator means including summing means interconnecting with said determining means and a reference voltage for comparing said summing means output signal with said reference voltage and for providing a third comparator means output signal related to the difference therebetween during said subsequent half cycle; and (c) reactive current source means interconnected with said third comparator means and said conductors for responding to said third comparator means output signal for providing reactive electrical current to said conductors of sufficient magnitude and direction to change the voltage across said line reactance during said subsequent half cycle to a value which causes the difference between said stored value and said reference value during said subsequent half cycle to be generally zero.

11. The combination as claimed in claim 10 comprising a second integral means for integrating the output signal from said determining means before it is provided to said comparator means to assist in reducing said difference between said stored voltage and said reference value during said subsequent half cycle.

* * * * *